Feb. 10, 1942.  L. M. PERSONS  2,272,250

REGULATOR VALVE

Filed July 1, 1940

INVENTOR:
LAWRENCE M. PERSONS,
By Lawrence O. Kingsland
ATTORNEY.

Patented Feb. 10, 1942

2,272,250

UNITED STATES PATENT OFFICE 2,272,250

REGULATOR VALVE

Lawrence M. Persons, St. Louis County, Mo., assignor to Automatic Control Corporation, St. Louis, Mo., a corporation of Delaware Application July 1, 1940, Serial No. 343,461

3 Claims. (Cl. 236—92)

The present invention relates to a solid-charge thermally controlled valve. More particularly it finds its use on refrigeration systems wherein the valve is controlled both by pressure and by temperature. Heretofore, efforts to employ solid-charge thermostat mechanisms have failed in this connection because of the incompressibility of the charge, with the result that it would not respond to both pressure and temperature changes.

Objects of the present invention, therefore, include the provision of a device for controlling a valve in response to both temperature and pressure changes, and to employ solid-charge in the same.

The objects also include the provision of means to adjust the temperatures of actuation without preventing the pressure operations; and particularly the provision of a solid-charge thermostat including an adjustable chamber which may expand in response to pressure changes, and the capacity of which may be adjusted.

Figure 1:
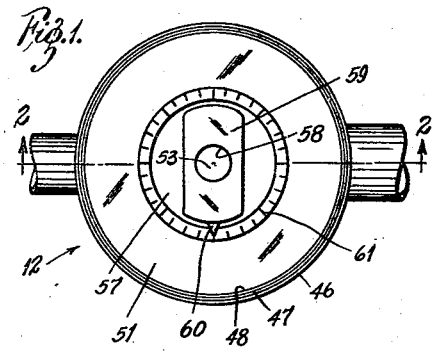
Fig. 1 is a plan view of the device.
Figure 3:
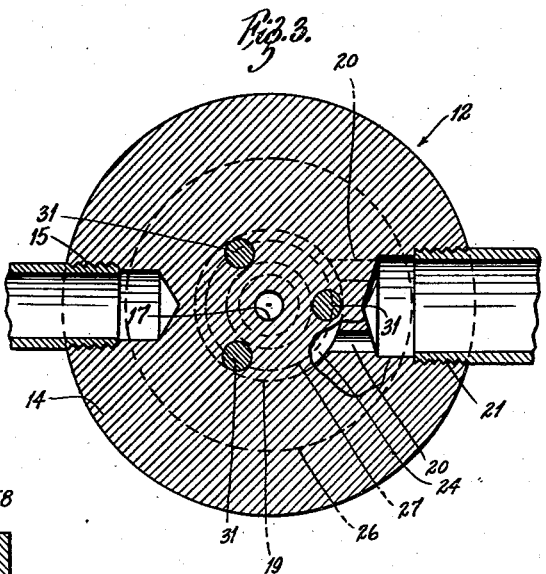
Fig. 3 is a horizontal section on the line 3—3 of Fig. 2.
Figure 2:
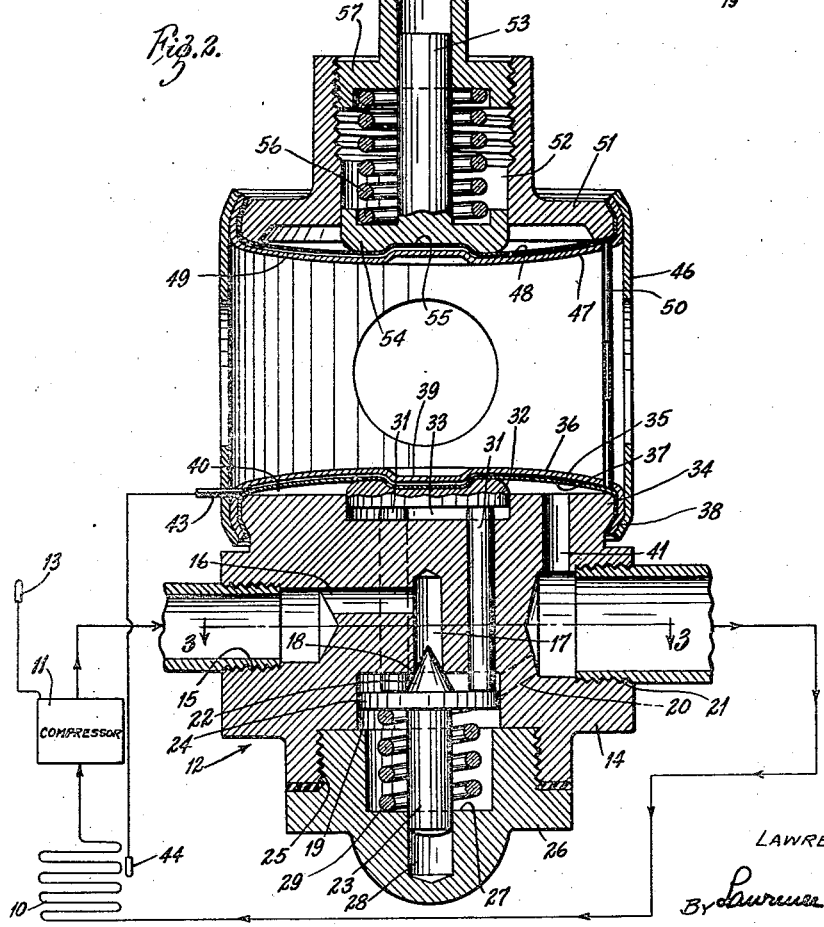
Fig. 2 is a vertical section on the line 2—2 of Fig. 1.

The usual refrigeration system as herein pertinent includes coils 10, a compressor 11, and an expansion valve 12, which here embodies the present invention. The compressor is thermostatically started and stopped by a thermostat including a bulb 13 located in the space to be cooled. The refrigerant is forced by the compressor through the expansion valve and into the coils, whence it returns to the compressor.

The expansion valve here includes a body 14 having a threaded inlet 15. From the inlet there leads a passage 16 to the upper section 17 of a valve chamber. The valve chamber has a valve seat 18 and a lower chamber 19. Outlet passages 20 lead to a threaded outlet 21.

There is a tapered valve 22 adapted to seat on the seat 18. This valve is on a stem 23 that has a wide flange 24 bearing on the circular lateral wall of the lower chamber 19.

The valve body 14 at the bottom has an internally threaded portion 25 into which the lower valve chamber 19 opens. A valve cap 26 is threaded into this opening and has a spring pocket 27 and a cylindrical hole 28 in which the valve stem 23 reciprocates and is guided. A spring 29 acts between the bottom of the pocket 27 and the flange 24 to urge the valve 22 against its seat.

The valve body contains three spaced openings in which three pins 31 reciprocate and are guided. These pins rest upon the top of the flange 24 of the valve and at their upper ends abut a cap 32 that may reciprocate and be guided in a opening 33 within the valve body 14.

The upper part of the valve body 14 is preferably circular and is grooved to provide an overhanging shoulder 34. An expansion chamber 35 is formed by a relatively rigid cup-like member 36 and a cup-like diaphragm element 37 which fits desirably within the member 36 and is adapted to be contiguous thereto throughout. The walls of the member 36 and the element 37 are sealed together near the open edges, and these edges are peened over at 38 around the flange 34 of the body member 14. The centers of the members 36 and 37 are depressed slightly as at 39 to engage in a corresponding depression in the cap 32, so that the latter does not slip.

Between the lower part of the diaphragm member 37 and the upper part of the body member 36 is an expansion chamber 40. A passage 41 puts the chamber 40 in communication with the outlet 21.

A capillary tube 43 extends through one corner of the cup-like member 36 and opens into the expansion chamber 35. This capillary tube has a bulb 44 at the end thereof disposed adjacent the coils 10.

A spacing ring 46 engages on the outside of the cup-like member 36 and over the flange of the body member 14. At its upper end there is fitted a second relatively rigid cup-like member 47 in which is fitted a second expansible cup-like diaphragm element 48 to form an expansion reservoir 49. A tube 50 connects the reservoir 49 with the expansion chamber 35.

Within the cup-like diaphragm element 48 there is secured a cap member 51 which has a center opening 52 therethrough threaded at its upper end. A plunger 53 has a lower portion 54 in which there is a depression 55 engaging over a corresponding depression in the members 47 and 48 for guidance. The upper surface of the portion 54 is cut out to receive the lower end of a spring 56, the other end of which bears against a cap 57 adjustably threaded into the upper end of the circular opening 52. This cap has a center opening 58 to receive and guide the plunger 53. It also at its upper end has a handle 59 having a pointer 60 engaging with graduations 61. Rotation of the handle displaces the cap 57 upwardly or downwardly, as the case may be, and varies the pressure of the spring 56 upon the diaphragm element 48.

The operation of the device is as follows:

During the normal cycle, it will be assumed that the compressor is operating. There will, therefore, be a high pressure condition (assume 120#) at the inlet 15, which pressure lowers at the expansion valve 22 and is, therefore, low (assume 25#) in the outlet 21. Correspondingly, the pressure within the pressure chamber 40 is low. Under this condition, the upper spring 56 will have forced liquid from the expansion chamber 49 through the tube 50 to the expansion chamber 35, so that the diaphragm 37 is moved downwardly, which by means of the cap 32 and pins 31 maintains the valve displaced from its seat. It will thus be seen that the upper spring 56 is stiffer than the lower spring 29.

Thereafter, when the temperature of the coils 10 reaches a predetermined low value, the liquid within the bulb 44 will contract. Under the influence of the springs, additional liquid from the chambers 49 and 35 will be forced out into the capillary tube 43 and into the bulb 44. This reduces the size of the expansion chamber 35 so that the spring 29 throttles down the valve 22, and reduces the flow of refrigerant into the coils.

When the bulb 13 reaches a predetermined minimum temperature for which the compressor thermostat is set, it will cause the compressor to be shut off. The high pressure liquid up to the valve seat 18 will then pass through the valve and the pressure on the low side of the valve tends to build up. As this takes place, this increased pressure acts through the passage 41 into the pressure chamber 40 and at a predetermined value (perhaps 10# above operating temperature) forces the diaphragm element 37 upwardly. The liquid within the expansion chamber 35 is incompressible, but it is forced out through the tube 50 into the upper chamber 49. As this pressure on the low side of the valve coupled with that of the spring 29, exceeds the force of the spring 56, the plunger 33 will be forced upwardly by this increase of pressure within the pressure chamber 40 and will cause displacement of the fluid from the chamber 35 to the chamber 49. The action permits the expansion valve to close, regardless of the temperature of the bulb 44.

Upon warming of the coils 10 after the system has been inactive, the liquid in the bulb 13 expands. This will cause the compressor to start, but at normal setting does not cause the valve to open. There follows a reduction of pressure on the low side of the valve, whereupon the spring 56 forces more fluid into the expansion chamber 49, and opens the valve. Later, as previously noted, the valve is throttled as the coils begin to cool, and modulated, by action of the liquid in the bulb 44 and the expansion chambers.

Adjustment of the handle 59 alters the pressure applied to the valve, and changes the pressure of operation at the outlet end. If the pressure of the spring is increased and a correspondingly higher outlet pressure is required to hold the valve open, there will result higher pressure and temperature of operation of the system. This will cause the refrigerant to travel further before expansion or boiling ceases, so that the ultimate limit thereof may include all of the coils 10, thereby increasing the efficiency of the system. A lowering of the pressure of the spring 56 in like manner lowers the outlet pressure and lowers the temperature of the refrigerant leaving the expansion valve, and causes boiling of the refrigerant to occur sooner, so that it may be completed sooner. This enables the refrigeration to be limited to the coils (or part of them), and enables avoidance of extending the refrigeration into the return line or even to the compressor itself.

And from the foregoing, it may be seen that the bulb 44, and the thermal liquid may likewise prevent extension of the refrigeration into the return line and compressor. Usually the bulb 44 is located adjacent the last coil, and when the cold thereat exceeds a value at which its heat absorbing capacity might continue with it into the return line, the liquid in the bulb contracts and causes the expansion valve to be throttled, to avoid the undesirable result.

The upper expansion chamber 49 need not be fixed, as by the ring 46, to the lower. The tube 50 is flexible, and may be made any suitable length for a desired set-up, such as with the upper chamber 46 at a remote convenient place.

It will be seen that there has been provided a valve subject to temperature and pressure changes, and which employs a solid-charge in so doing. There has been provided a thermal device with a reservoir to take any excess thermal fluid, after the main expansion chamber has reached the limit of its expansion permitted under the given conditions, and which reservoir is so governed that it does not prevent normal expansion of the expansion chamber.

What is claimed is:

1. In a device of the kind described, a valve housing, a valve chamber in the housing, a valve therein, a diaphragm secured across a part of the housing, a cover over the diaphragm and sealed thereto about the edges, said diaphragm and housing providing a pressure chamber, a passage in the housing connecting the pressure chamber with the valve chamber, the cover and the diaphragm forming a first expansion chamber, a tube connected into said first expansion chamber, support means on the valve housing, a second expansion chamber on the support means, pressure means resisting expansion thereof, means connecting the two expansion chambers, and an expansible fluid entirely filling the two expansion chambers, the connecting means, and the tube.

2. In a device of the kind described, a valve housing, a valve chamber in the housing, a valve therein, a diaphragm secured across a part of the housing, a cover over the diaphragm and sealed thereto about the edges, said diaphragm and housing providing a pressure chamber, a passage in the housing connecting the pressure chamber with the valve chamber, the cover and the diaphragm forming a first expansion chamber, a tube connected into said first expansion chamber, support means comprising a cylindrical frame secured to the valve housing around the edges of the cover, and a second expansion chamber on said support, said second expansion chamber comprising a diaphragm and a cover, means connecting the two expansion chambers, and an expansible fluid entirely filling the two expansion chambers, the connecting means, and the tube.

3. In a device of the kind described, a valve housing, a valve chamber therein, a valve in the chamber, relatively weak yieldable means urging the valve in one direction, a diaphragm across the valve housing and with the housing providing a pressure chamber, means establishing communication between the pressure chamber and the valve chamber, means connecting the diaphragm with the valve, said yieldable means being adapted to urge the connecting means against the diaphragm, a cover means secured to the housing, and enclosing the diaphragm to form a first expansion chamber, a cylindrical frame around the cover and extending from the housing, a second cover in the cylindrical frame, a second diaphragm within the second cover providing a second expansion chamber, yieldable means adapted to compress the second expansion chamber, means to adjust the said yieldable means, communication means between the two expansion chambers, a bulb connected with one expansion chamber, and a fluid filling the bulb, the two expansion chambers and the communication means.

LAWRENCE M. PERSONS.